Figure 1:
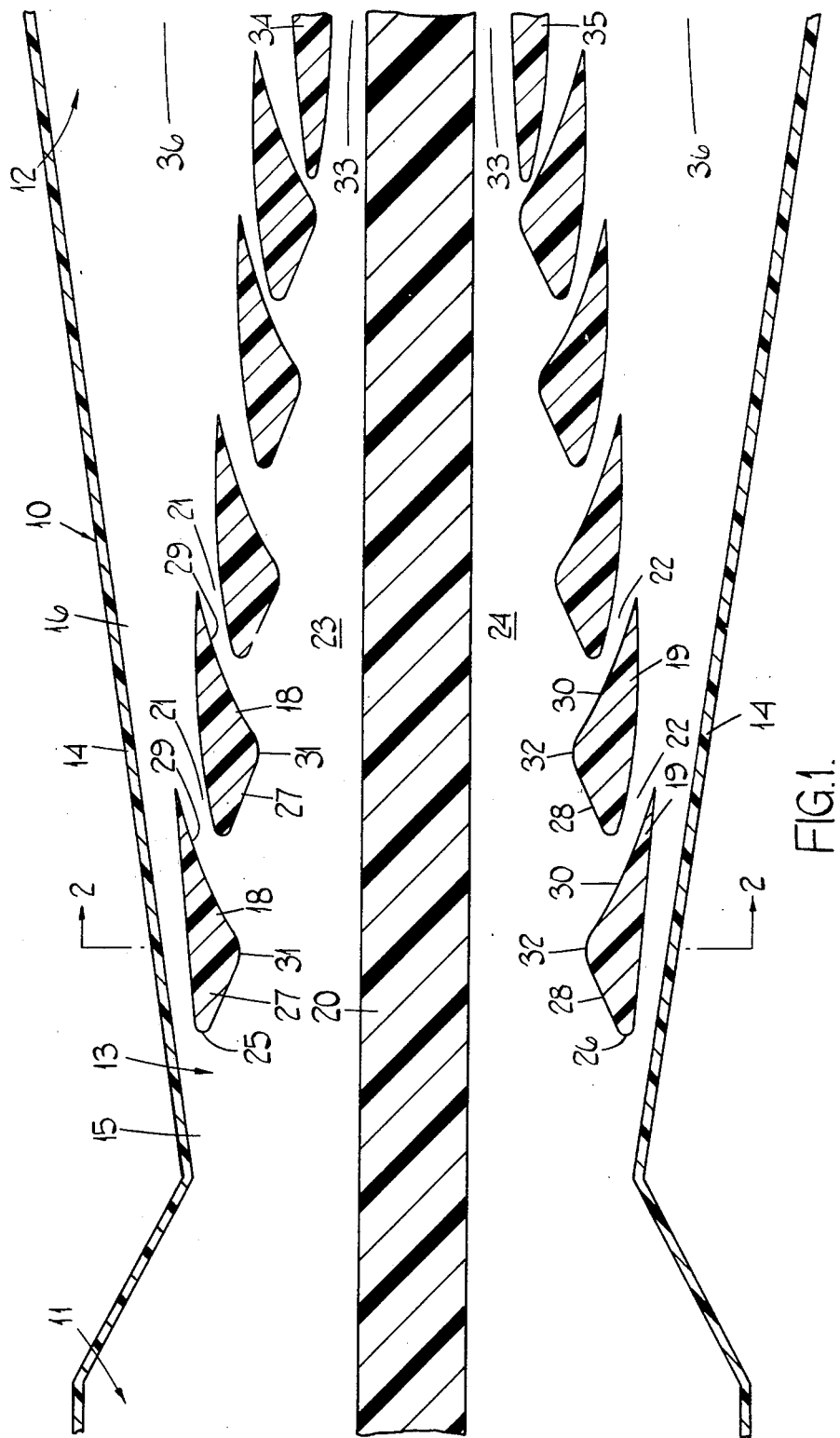

United States Patent [19]

Maden

[11] 4,123,241

[45] Oct. 31, 1978

[54] FILTER

[75] Inventor: Kenneth H. Maden, Accrington, England

[73] Assignee: Lucas Industries Limited, Birmingham, England

[21] Appl. No.: 688,721

[22] Filed: May 21, 1976

[30] Foreign Application Priority Data

May 23, 1975 [GB] United Kingdom ............... 22571/75

[51] Int. Cl.² ............................................. B01D 45/18
[52] U.S. Cl. ................................ 55/442; 55/DIG. 37; 55/306
[58] Field of Search ......... 55/440, 442, 443, DIG. 37, 55/306

[56] References Cited

U.S. PATENT DOCUMENTS

| | | | |
|---|---|---|---|
| 3,155,474 | 11/1964 | Sexton | 55/442 |
| 3,369,349 | 2/1968 | Farr | 55/442 |
| 3,385,037 | 5/1968 | Farr et al. | 55/443 |
| 3,958,966 | 5/1976 | Keller | 55/442 |

*Primary Examiner*—Bernard Nozick
*Attorney, Agent, or Firm*—Holman & Stern

[57] ABSTRACT

A filter for separating material of greater density from material of lesser density, comprises a hollow body having an inlet at one end thereof for the materials to be separated, and outlets at the other end thereof for the separated materials. A passage joins the inlet to the outlets and has two sets of separator vanes disposed therein. Alternatively, a single set of separator vanes is disposed in the passage. Each set of vanes is positioned in the passage so as to define a first, convergent flow path for the material of greater density. The vanes in each set are spaced longitudinally of the passage such that a plurality of second, divergent flow paths for the material of lesser density are defined between respective pairs of adjacent vanes. Each vane has an upstream edge, a first surface portion extending from the edge in a downstream direction and facing in an upstream direction, and a second surface portion which is concave and which faces in the downstream direction. The first and second surface portions are joined by a junction, and the junction of the upstream vane of each pair of adjacent vanes is disposed so as to mask the second flow path defined between that pair of vanes with respect to the longitudinal direction of the passage. In this way, the material of greater density is prevented from passing through the second flow paths.

45 Claims, 19 Drawing Figures

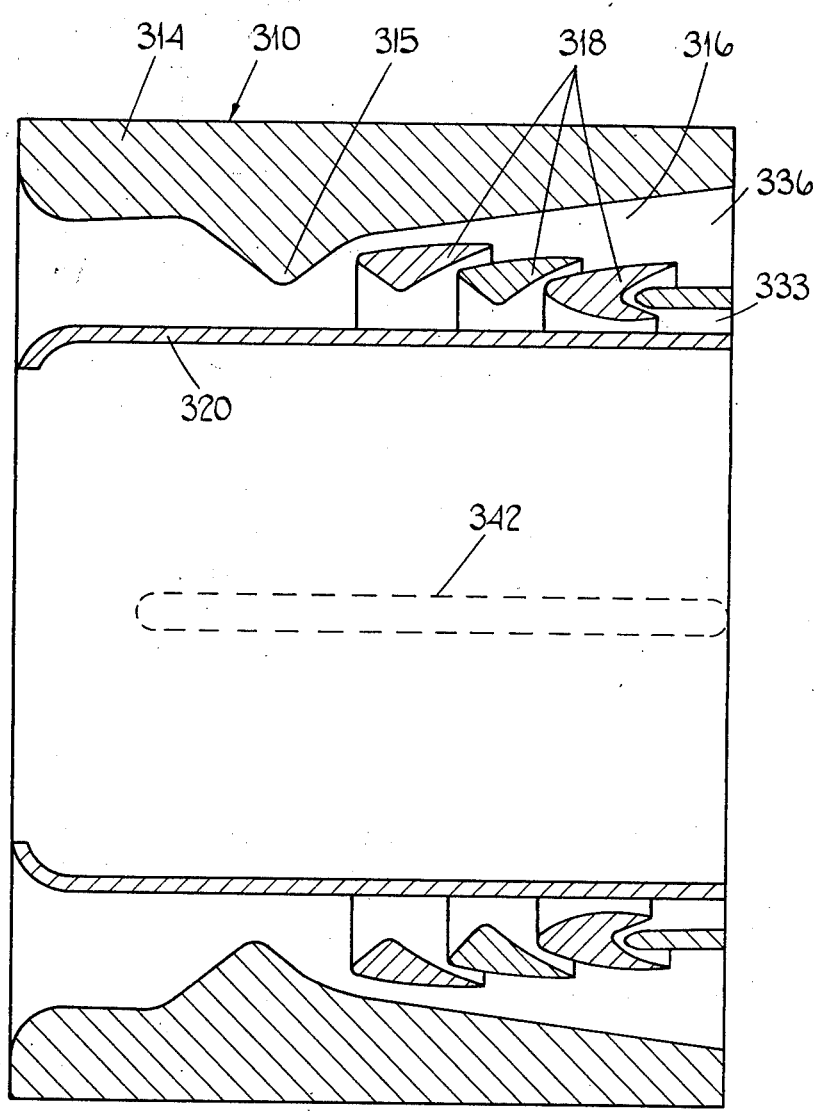

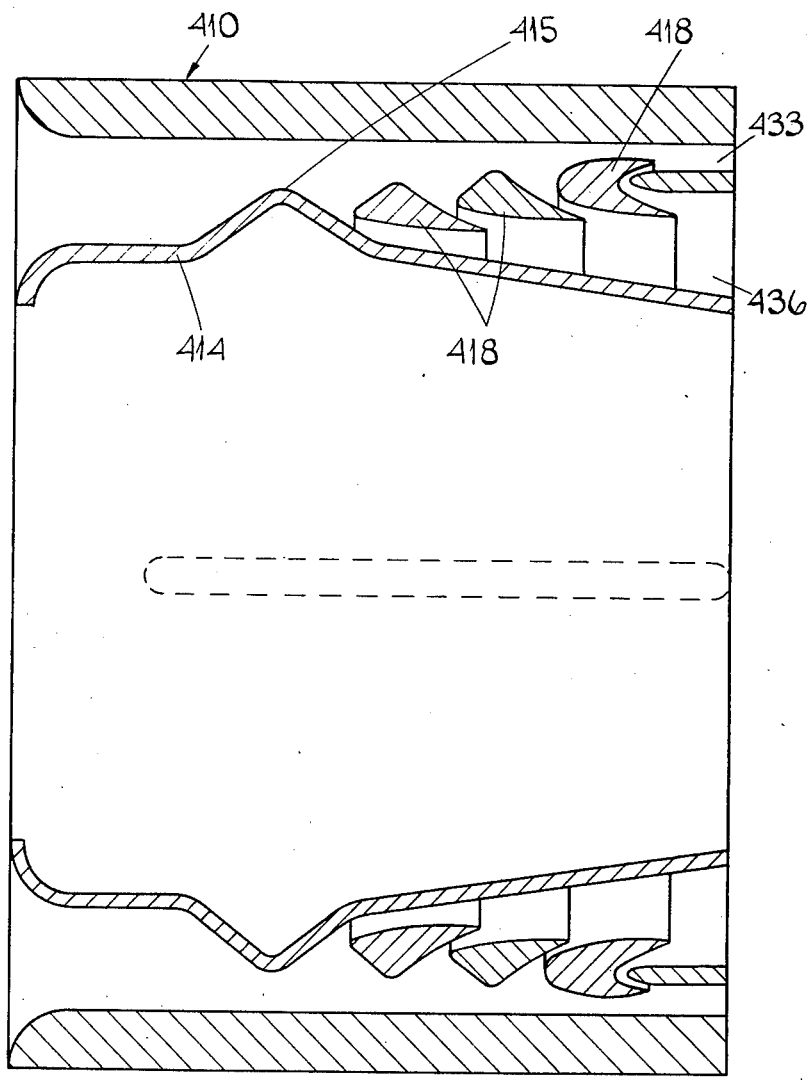

FILTER

This invention relates to a filter which is intended for separating material of greater density from material of lesser density, and is particularly, though not exclusively, concerned with a filter for separating solid particulate material from air.

According to the present invention, there is provided a filter for separating material of greater density from material of lesser density, said filter comprising (i) a hollow body, (ii) an inlet at one end of the body for materials to be separated, (iii) an outlet at the other end of the body for each separated material (iv) a passage extending from the inlet to the outlets and (v) at least one set of separator vanes in said passage positioned to define at least one side of a first flow path (which is preferably convergent) for the material of greater density, each vane having an upstream adge and a surface which faces said first flow path, each said surface having (a) a first portion which extends from said edge in the downstream direction and which faces in the upstream direction (b) a second portion which extends downstream of the first portion and which faces in the downstream direction, and (c) a junction between said first and second portions, adjacent vanes of the or each set being mutually spaced longitudinally of the passage so as to define second flow paths therebetween for the material of lesser density, the vanes being so disposed that the upstream edge of a downstream vane in each pair of adjacent vanes in the or each set is aligned, in the longitudinal direction of the passage, with part of the second portion of the surface of the upstream vane in said pair of adjacent vanes, said part being spaced from the junction of said upstream vane so that said junction of said upstream vane masks the second flow path defined between said upstream vane and said downstream vane.

Advantageously, each second portion is of concave form in the longitudinal direction of the body.

In a preferred arrangement, at least one of the second flow paths defined between adjacent vanes has a portion which extends in an upstream direction relative to the intended direction of flow of material along said first flow path. Said at least one of the second flow paths is desirably disposed in a downstream end portion of the body.

Figure 2:
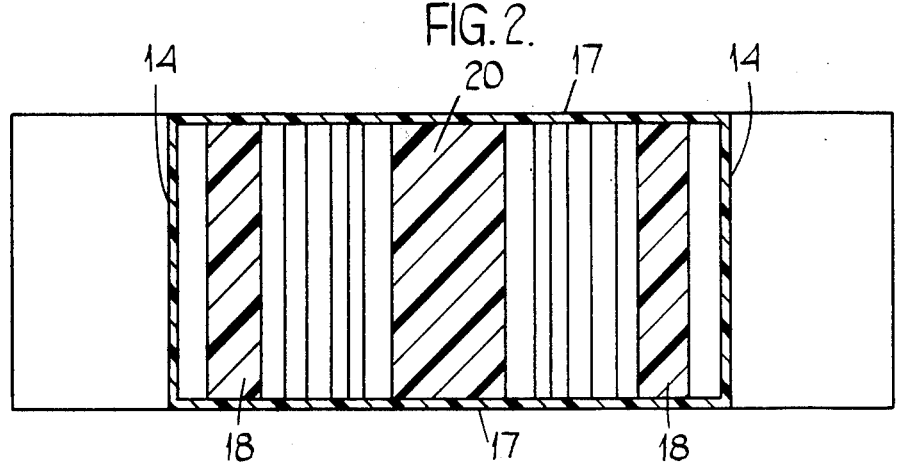
Figure 4:
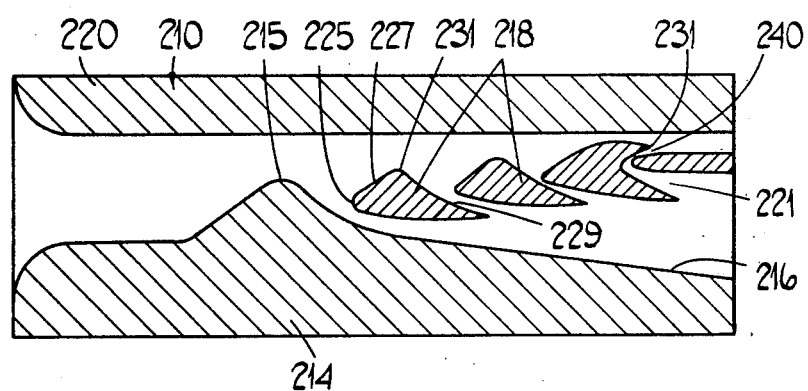
Figure 5:
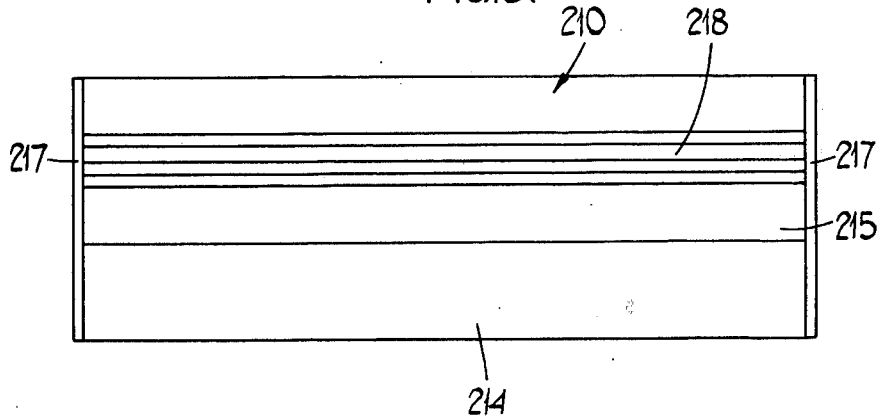
Figure 3:
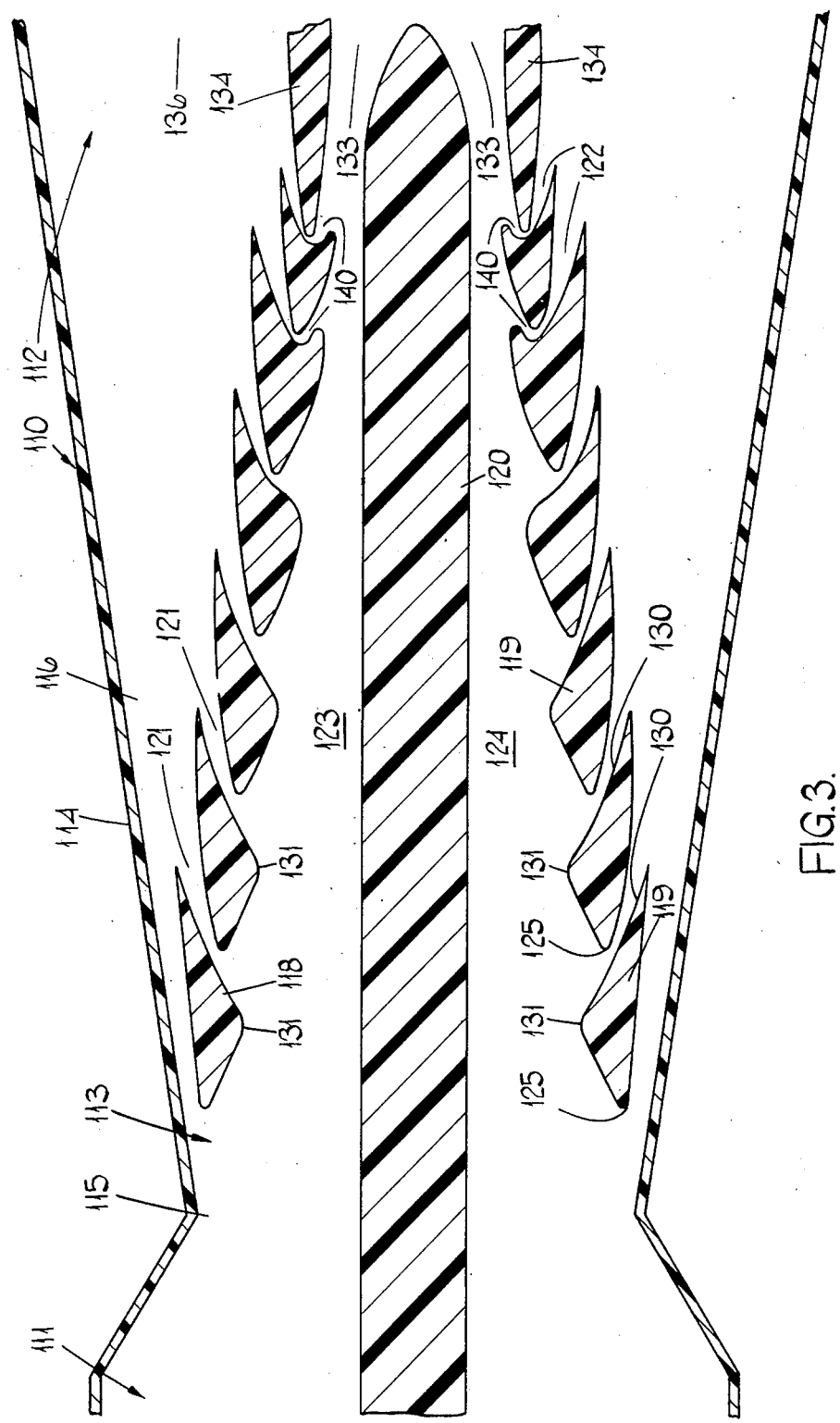
Figure 8:
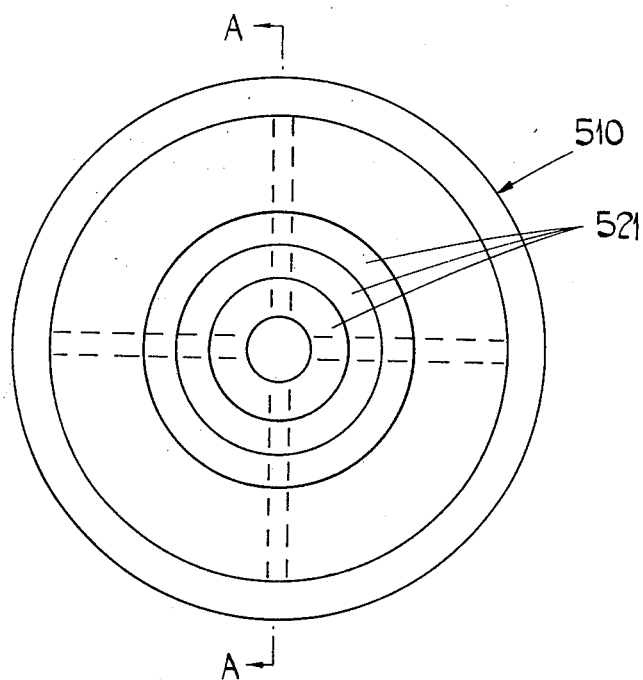
Figure 9:
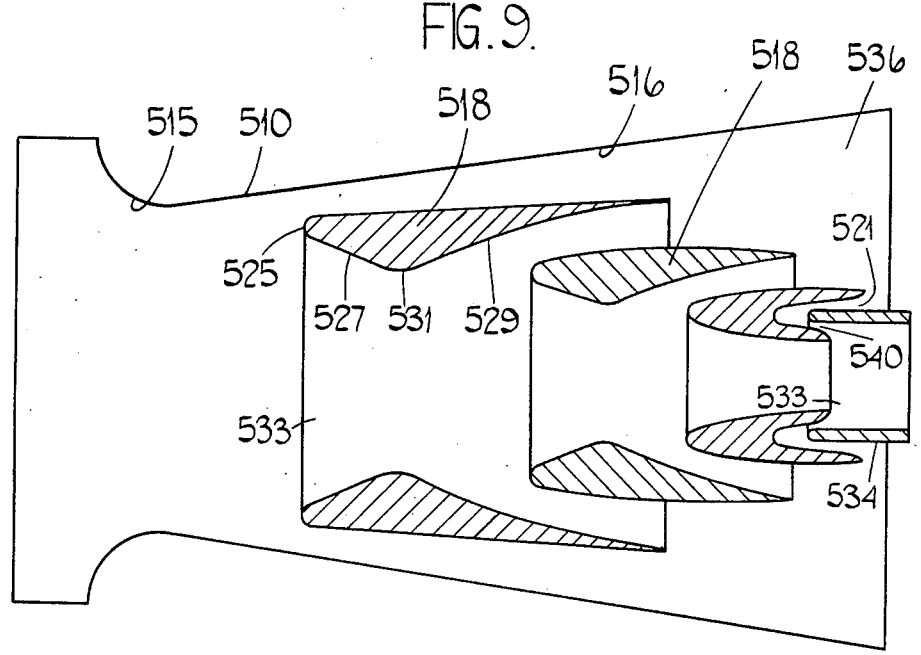
Figure 10:
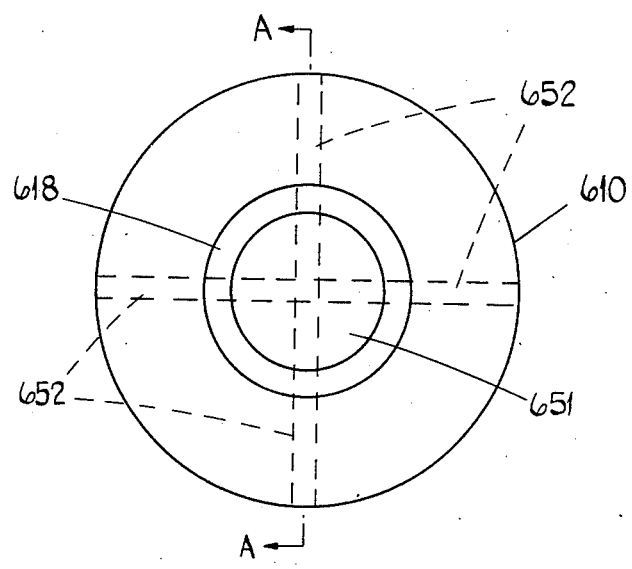
Figure 11:
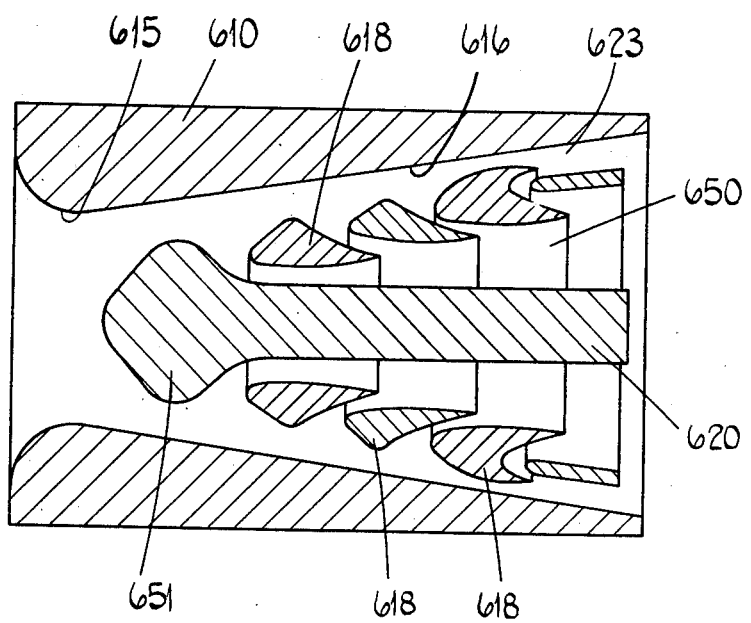
Figure 12:
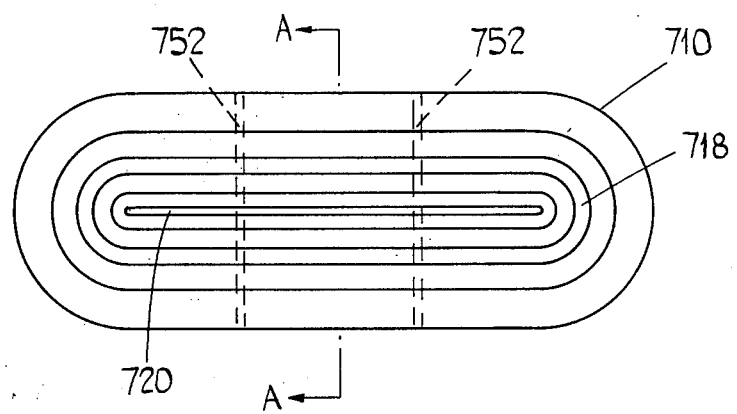
Figure 13:
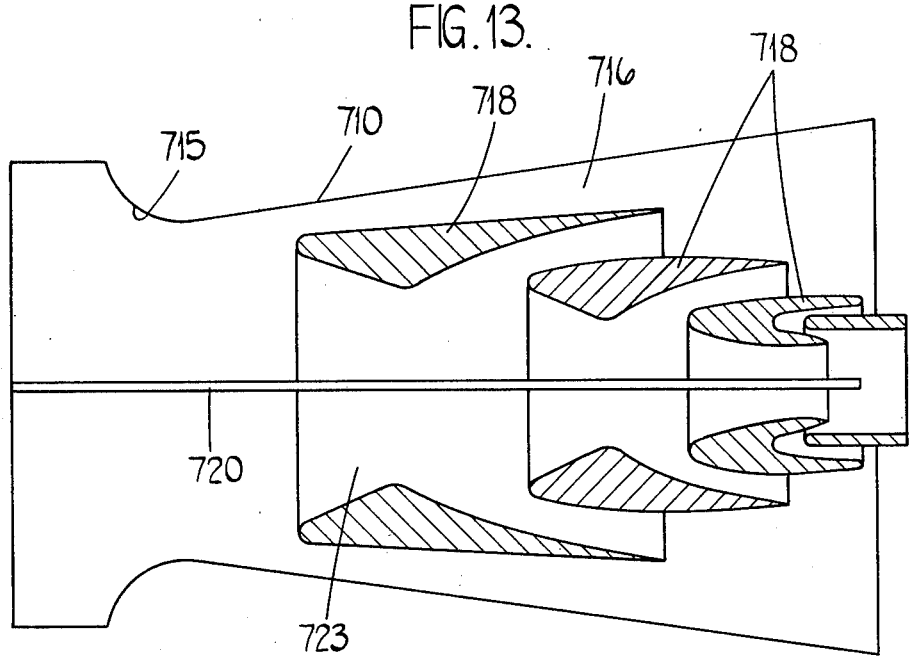
Figure 14:
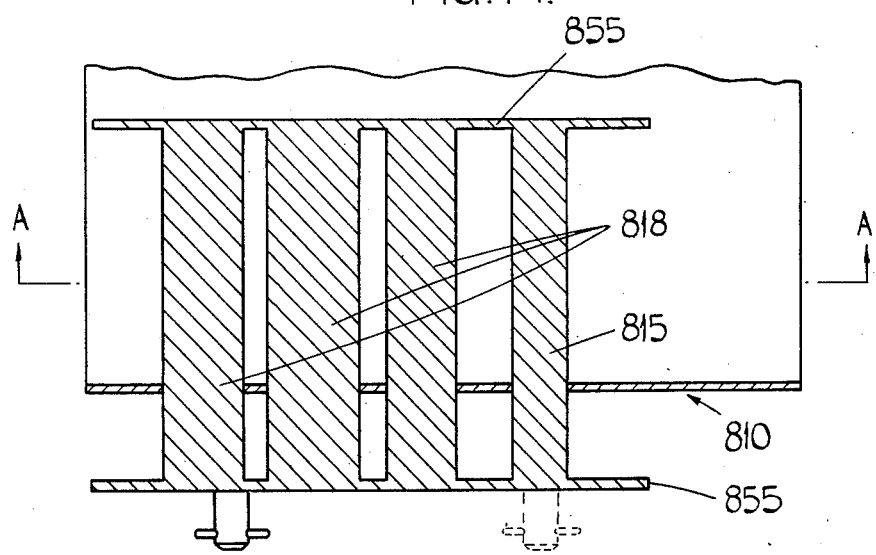
Figure 15:
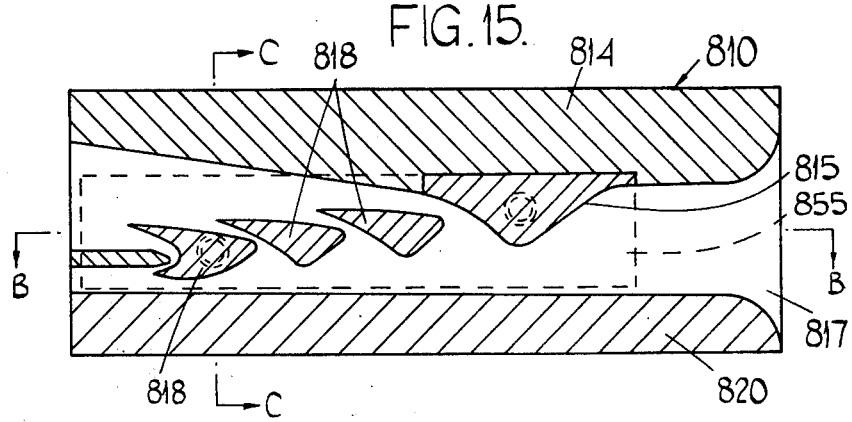
Figure 16:
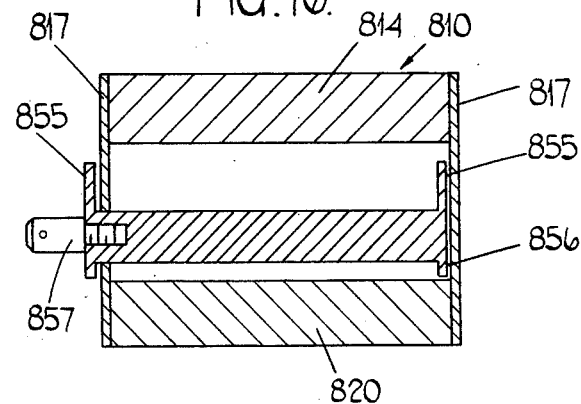
Figure 17:
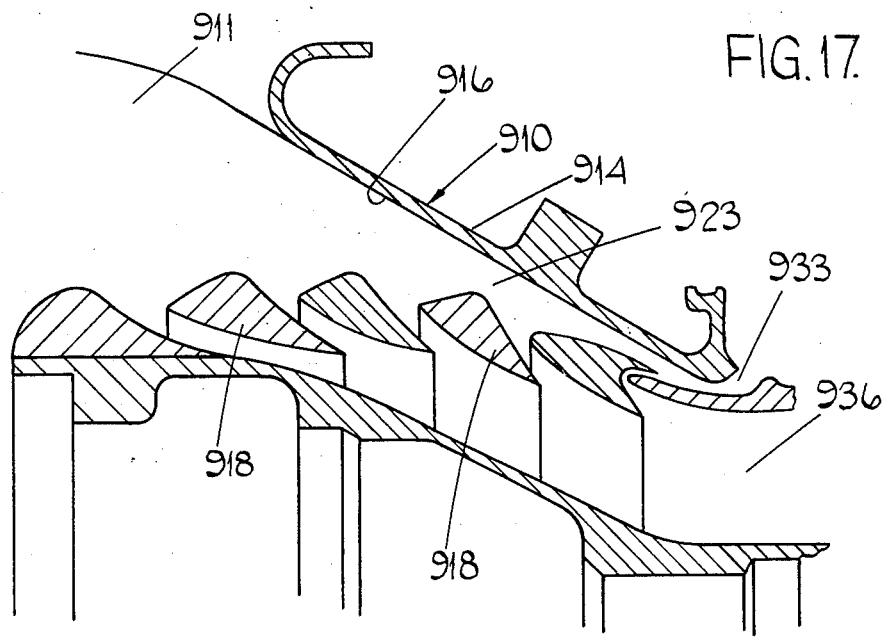
Figure 18:
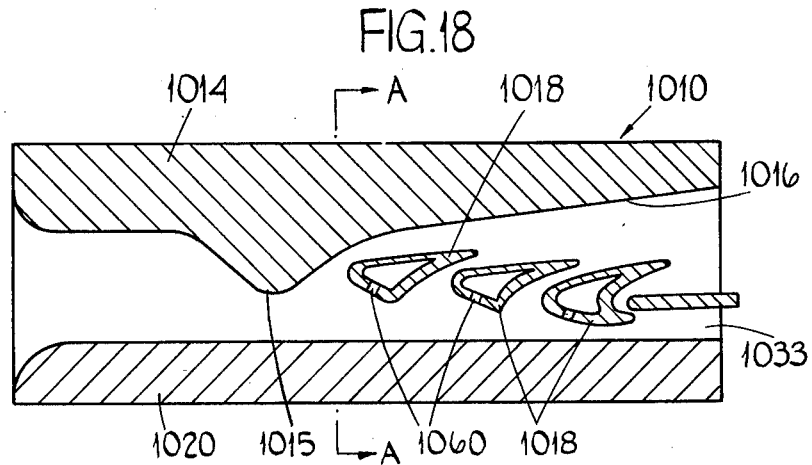
Figure 19:
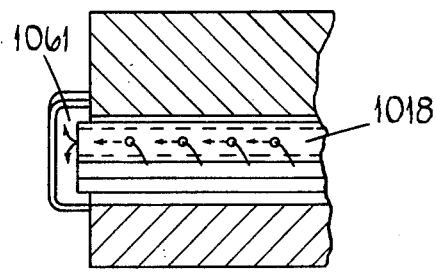

Embodiments of the present invention will now be described, by way of example, with reference to the accompanying drawings, in which:

FIG. 1 is a longitudinal sectional view of a filter according to the present invention for separating solid particulate material from air, FIG. 2 is a cross section on the line 2—2 of FIG. 1, FIG. 3 is a longitudinal section of another filter according to the present invention, also for separating solid, particulate material from air, FIG. 4 is a longitudinal sectional view of another filter according to the present invention, FIG. 5 is an end view of the filter of FIG. 4, FIG. 6 is a longitudinal sectional view of another filter according to the present invention, FIG. 7 is a longitudinal sectional view of another filter according to the present invention, FIG. 8 is an end view of another filter according to the present invention, FIG. 9 is a somewhat schematic longitudinal section on the line A—A of FIG. 8, FIG. 10 is an end view of another form of filter according to the present invention, FIG. 11 is a sectional view on the line A—A of FIG. 10, FIG. 12 is an end view of another form of filter according to the present invention, FIG. 13 is a somewhat schematic section on the line A—A of FIG. 12, FIG. 14 is a longitudinal section on the line B—B in FIG. 15 of another form of filter according to the present invention, FIG. 15 is a longitudinal sectional view on the line A—A of FIG. 14, FIG. 16 is a cross sectional view on the line C—C of FIG. 15, FIG. 17 is a longitudinal sectional view of part of another form of filter according to the present invention, FIG. 18 is a longitudinal sectional view of another form of filter according to the present invention, and FIG. 19 is a view showing part of section A—A of FIG. 18.

Referring to FIGS. 1 and 2 of the drawings, the filter illustrated therein is a so-called ballistic filter. The filter comprises a hollow body 10 having an inlet 11, an outlet end 12, and a passage 13 between the inlet end 11 and outlet end 12.

The body 10 is composed of a pair of configurated walls 14 which together define a throat or neck 15 in the passage 13, and a divergent passage portion 16 downstream of the neck 15. The walls 14 are interconnected by a pair of opposed, parallel walls 17 (see FIG. 2) which also define part of the body 10.

The filter further comprises two sets of separator vanes 18 and 19 respectively which are disposed on opposite sides of a partition 20 extending co-axially with respect to the passage 13. Each separator vane 18, 19 and the partition 20 extend between and are secured to the opposed walls 17 (see FIG. 2). The vanes 18, 19 respectively of each set are spaced apart longitudinally of the passage so as to define respective flow paths 21, 22 therebetween for passage of separated air. Each set of vanes 18, 19 defines one side of a flow path 23, 24 for separated particulate material. As can be seen from FIG. 1, each flow path 23, 24 is convergent. Each vane 18, 19 has an upstream edge 25, 26 and a surface which faces the respective flow path 23, 24. The said surface of each vane 18, 19 has (a) a first portion 27, 28 which is generally linear in the longitudinal direction of the body, and which extends from the edge 25, 26 in a downstream direction but which faces in the upstream direction so as to be inclined at an angle of 34° to the axis of body 10, (b) a second portion 29, 30 which extends downstream of the first portion 27, 28 which faces in the downstream direction and which is concave in the longitudinal direction of the body 10, and (c) a junction 31, 32 between the first and second portions 27, 28 and 29, 30 respectively. The edge 25, 26 of a downstream vane 18, 19 is aligned, in the longitudinal direction of passage 13, with an intermediate part of the second portion 29, 30 of an adjacent upstream vane 18, 19. In other words, in this embodiment, the junction 31, 32 of an upstream vane 18, 19 in a set lies nearer to the partition 20 than the edge 25, 26 of an adjacent downstream vane 18, 19. In this way, each junction 31, 32 masks the flow path 21, 22 between adjacent vanes 18, 19 relative to the direction of flow of particulate material in respective flow path 23, 24.

Each flow path 21, 22 is of generally divergent form going from its entrance, as defined between the edge 25, 26 and the respective second portion 29, 30, to its exit and the minimum cross sectional area of each flow path 21, 22 decreases going from the extreme upstream flow path 21, 22 to the extreme downstream flow path 21, 22 of each respective set of vanes 18, 19. At the outlet end 12 of the body 10 there is defined a solid, particulate material outlet 33 between the partition 20 and each of a pair of further vanes 34, 35 disposed on opposite sides of partition 20 downstream of the extreme downstream vane 18, 19. An air outlet 36 is defined between each divergent wall 14 and the respective vane 34, 35.

In use, 190 cu. ft/min of air containing solid particulate material, e.g. dust, at a concentration of 10 milligrams per cubic foot of air is passed into the body 10 via the inlet end 11. The mixture is constricted by the neck 15 so as to increase its velocity to 150 ft/sec. and is then allowed to expand in the divergent passage portion 16. Because of the relatively high inertia of the solid, particulate material compared with that of the air, the former is directed into the converging flow paths 23, 24 and passes therealong, the convergent nature of the paths 23, 24 maintaining the velocity of the particles. Passage of particulate material through the respective flow paths 21, 22 is prevented because of the efficient masking effect of the respective junctions 31, 32 and because of the inclinations of first portions 27, 28 so that the particulate, solid material is generally constrained to flow out of the body 10 via outlets 33. Whilst some of the air passing through the body 10 will also leave therefrom via outlets 33, a very large proportion of the air will pass through the flow paths 21 and 22 since it has a much lower inertia than that of the particles, and can therefore expand more readily in the divergent passage portion 16. The air passing through flow paths 21, 22 leave the body 10 via the outlets 36 to be passed, for example, to apparatus which requires a source of relatively particle free air, e.g. the inlet manifold of an internal combustion engine. The separating efficiency of the filter is 83.2% with only 10% of the air being "lost" by passing through the outlets 33.

Referring now to FIG. 3 of the drawings, the filter illustrated therein is also employed for separating solid, particulate material from air and is similar to the filter described hereinabove with reference to FIGS. 1 and 2. Parts of the filter of FIG. 3 which are similar to parts of the filter of FIGS. 1 and 2 are accorded the same reference numeral but prefixed by the numeral 1. The filter of FIG. 3 operates in the same way as that of FIGS. 1 and 2 but is more efficient in its separating ability. As can be seen from FIG. 3, the filter differs from that of FIGS. 1 and 2 in that the flow paths 121 and 122 at the respective downstream ends of the sets of separator vanes 118 and 119 are more tortuous than the flow paths 21 and 22, respectively. The flow paths 121 and 122 become increasingly tortuous going from the extreme upstream flow path 121, 122 to the extreme downstream flow path 121, 122. Furthermore, the two extreme downstream flow paths 121, 122 of each set are so arranged that a portion 140 thereof extends in an upstream direction relative to the general direction of flow of material through passage 113.

With a filter of the above described type for a main flow of dust contaminated air of 190 cu.ft/min, a separation efficiency of as high as 89.7% can be attained with only 10% of the air being "lost" by passing through the outlets 133.

Referring now to the filter of FIGS. 4 and 5, the filter comprises a generally rectangular body having a side 214 thereof internally configured to provide a throat 215 within the body, and a divergent passage portion 216. The opposite side of the body 210 is provided by a predominately planar member 220 which corresponds to partition 20 in the embodiment of FIGS. 4 and 5 thus, in effect, the filter construction of FIGS. 4 and 5 is similar to one half of the filter of FIGS. 1 and 2. Disposed within the divergent passage portion 216 are a set of three vanes 218 having upstream edges 225 and a surface including a first portion 227, a second portion 229, and a junction 231. The disposition of the vanes 218 relative to one another and relative to the divergent passage portion 216 is similar to the disposition of the vanes 18 in the embodiment of FIGS. 1 and 2. In particular, the junction 231 of an upstream vane 218 lies nearer to the internal surface of member 220 than the edge 225 of an adjacent downstream vane 218. In a similar manner to the extreme downstream flow path 121 of the embodiment of FIG. 3, an extreme downstream flow path 221 of this embodiment is provided with a portion 240 which extends in an upstream direction relative to the general direction of flow of material through divergent passage portion 216. Opposed parallel walls 217 interconnect opposite sides of surface 214 and member 220 in a similar manner to the interconnection of walls 14 by walls 17 in the embodiment of FIGS. 1 and 2. The filter in the embodiment of FIGS. 4 and 5 operates in a similar manner to that described with reference to the embodiment of FIGS. 1 and 2.

Referring now to the embodiment of FIG. 6, the filter illustrated therein comprises a hollow body 310 which is of annular form and which has an outer annular wall 314 corresponding to wall 214 of body 220, and an inner annular wall 320 corresponding to member 220 of the filter of FIG. 4. As in the case of the filter of FIG. 4, the wall 314 is provided with a throat 315. Throat 315 extends around the wall 314 internally thereof and there is defined within the body 310 a divergent passage portion 316 corresponding to divergent passage portion 216 of the embodiment of FIG. 4. Disposed within the divergent passage portion 316 are a set of annular vanes 318 whose cross sectional shape and whose disposition correspond to the cross sectional shape and disposition of vanes 218. Apart from the annular arrangement of the filter of FIG. 6, the operation thereof is the same as that of the filter of FIGS. 4 and 5. In this embodiment, an annular outlet 333 is provided for particulate material and this outlet is surrounded by an annular outlet 336 for air from which particulate material has been removed during passage of the mixture through body 310. Support vanes 342 (only one shown) serve to support the wall 320.

Referring now to FIG. 7 of the drawings, the filter illustrated therein is very similar to that of FIG. 6. However, in this embodiment, a throat 415 corresponding to throat 315 of the embodiment of FIG. 6 is provided on an internal wall 414 of body 410. Vanes 418 are provided in the body and have a similar cross sectional shape and disposition to vanes 318. However, the cross sectional shape of the vanes 418 is inverted with respect to that of the vanes 318. This feature, together with the provision of the throat 415 on the internal wall 414 of the body 410 means that outlet 433 for particulate material is disposed externally of outlet 436 for clean air as opposed to the reverse arrangement for the outlets 333 and 336 of the embodiment of FIG. 6. Apart from this, the filter according to FIG. 7 operates in the same way as that of FIG. 6.

Referring now to FIGS. 8 and 9, the filter illustrated therein comprises a hollow tubular body 510 of circular cross section. Within the body 510 is provided a throat or neck 515 and a divergent passage portion 516 corresponding to the neck 15 and divergent passage portion 516 of the embodiment of FIGS. 1 and 2. Disposed within the divergent passage portion 516 are a plurality of annular vanes 518 which are stacked together to define an internal, converging passage 533 for particulate material. Each vane 518 is provided with an upstream edge 525 and a surface facing the passage 533 which comprises a first portion 527, a second portion 529, and a junction 531. The upstream edge 525, the first and second portions 527 and 529, and the junction 531 of each vane 518 corresponds to the upstream edge 25, the first and second portions 27 and 29, and the junction 31 of the vane 18 of the embodiment of FIG. 1. The disposition of the vanes 518 is similar to that of the vanes 18 in that the junction 531 of an upstream vane 518 lies nearer to the longitudinal axis X—X of body 510 than the upstream edge 525 of an adjacent downstream vane 518. As in the case of the embodiment of FIGS. 4 and 5, an extreme downstream flow path 521 is provided with portion 540 which extends upstream with respect to the general direction of flow of air through body 510. A third annular vane 534 provides an outlet 533 for particulate laden air whilst an annular outlet 536 corresponding to outlet 36 of the embodiment of FIG. 1 is disposed externally of annular vane 534.

Referring to the embodiment of FIGS. 10 and 11, the filter illustrated therein comprises a tubular body 610 having a throat 615 and a divergent passage portion 616 within which are disposed a set of annular vanes 618 which, apart from being of annular form, have a similar cross section to vanes 218 of the embodiment of FIG. 4. An annular, convergent passage 623 for dust laden air is provided between the vanes 618 and the body 610, whilst an annular, divergent passage 650 is provided for clean air between the vanes 618 and a central core 620 which has an enlarged upstream end 651 serving to prevent air entering the body 610 from passing directly into clean air passage 650. Supports indicated by dotted lines 652 in FIG. 10 serve to support the vanes 618 and the core 620 within the body 610. The filter illustrated in FIGS. 10 and 11 operates in the same manner as that described in the previous embodiments.

Referring now to FIGS. 12 and 13, the filter illustrated therein is similar to that of FIGS. 8 and 9 and comprises a body 710 having a throat 715, a divergent passage portion 716, and a plurality of vanes 718 disposed therein. The body 710 and the vanes 718 are each of race course cross section as can be seen from FIG. 12. A central, planar partition 720 is disposed centrally of the body 710 and serves, with the vanes 718 to define an annular, converging passage for dust laden air within the body 710. The vanes 718 and partition 720 are held in the body 710 by supports 752 (indicated in dotted line in FIG. 12). Apart from the above described differences, the filter of FIGS. 12 and 13 operates in the same way as the filter described with reference to FIGS. 8 and 9. In particular, the section of each vane 718 illustrated in FIG. 13 is similar to the section of the blade 518 in the filter of FIGS. 8 and 9, and the relative disposition of the vanes 718 is similar to the relative disposition of the vanes 518 of FIGS. 8 and 9.

Referring now to FIGS. 14 to 16 of the drawings, the filter illustrated therein is similar to that of FIGS. 4 and 5 and corresponding parts are accorded reference numerals having common tens and unit digits. In this embodiment, body 810 has walls 814 and 820 corresponding respectively to walls 214 and 220, and side walls 817 corresponding to side walls 217. Vanes 818 are positioned relative to one another and have cross sections (as viewed in FIG. 15) similar to the mutual disposition and cross sections of respective vanes 218. However, in this embodiment, the vanes 818 are integrally united by means of a pair of integral side plates 855 and a portion 815 defining a throat corresponding to throat 215 of the embodiment of FIGS. 4 and 5 is also integrally formed with side plates 855. The left hand side wall 817 as viewed in FIG. 16 is formed with apertures therein corresponding to the cross sectional shapes of the respective vanes 818 and portion 815. The left hand side plate 855 is disposed externally of body 810 whilst the right hand side plate 855 is disposed within the body 810 and has a scraper foot 856 extending below the vanes 818 and portion 815. A pair of lugs 857 can be engaged in screw threaded fashion with the side plate 855 which is disposed externally of the body 810. The whole assembly of vanes 818, portion 815, abd side plates 855 is slidable laterally relative to body 810. This can be seen most clearly in FIGS. 14 and 16. In the position of the assembly as shown in full line in FIG. 16, the filter is in a position in which it can effect a filtration operation. Over a period of time, dust or other particulate material will tend to collect on portion 815 and upon vanes 818. In order to clean these, the studs 857 are attached and the assembly is then withdrawn from the body 810 to the position shown in chain dot line in FIG. 16. In so doing, the portions of the left hand side plates 855 around the apertures therein serve to scrape the dust or other particulate material from the vanes 818 and portion 815. Any dust or particulate material which has settled on the floor of the body 810 is scraped to one side of the body by means of the foot 856 and, having thus being loosened, can be relatively easily removed from the body 810. The assembly of vanes 818 and portion 815 can then be slid back into the position shown in full line in FIG. 16 for use.

Referring now to FIG. 17, the filter is only partly shown and comprises a body 910 having an inlet 911, a passage 916 and a plurality of vanes 918 disposed in the passage 916. The disposition of the vanes 918 and the section thereof illustrated in FIG. 17 is similar to that described with reference to the vanes 418 of the filter of FIG. 7. An annular outlet 933 for dust laden air is provided externally of an outlet 936 for clean air in a similar manner to the outlets 433 and 436 of the filter of FIG. 7. In this embodiment, however, the passage 916 is not a divergent passage but is, in fact, a converging passage. However, the vanes 918 define with an outer wall 914 of the body 910 a converging passage 923 for the dust laden air. The converging nature of passage 916 ensures that the velocity of the clean air is maintained. In essence, the filter illustrated in FIG. 17 operates in a similar manner to that described with reference to the filter of FIG. 7.

Referring lastly to FIGS. 18 and 19 of the drawings, the filter illustrated therein is similar to the filter of FIGS. 4 and 5 and similar parts are indicated by common tens and digits. In the filter illustrated in FIGS. 18 and 19, body 1010 has a pair of opposed walls 1014 and 1020 defining together a divergent passage 1016 preceded by a throat 1015. Disposed within passage 1016 is a plurality of vanes 1018 whose outline and mutual disposition is similar to the outline and mutual disposition of vanes 218 of the filter of FIGS. 4 and 5. However, in this embodiment, each vane 1018 is hollow and is provided with a slot 1060 therein. The slot 1060 is positioned in a normally stagnant zone. The space within each vane 1018 communicates with a common duct 1061 (see FIG. 19) which is connected to outlet 1033 for dust laden air.

In all of the above described embodiment, an efficient separating action is obtained because of the above described masking effect of the aforesaid junction between the first and second portions of that surface of the vane which faces the converging passage for dust laden air, i.e. for the material of greater density. This masking effect is enchanced by making the aforementioned second portions of the vanes concave. Furthermore, the separation efficiency is enhanced because of the provision in all of the filters save for the filter of FIGS. 1 and 2 of a portion of the clean air flow path extending in an upstream direction. The inclination of the aforementioned first portion of the vanes has been previously described as 34°. This inclination is particularly suitable. However, the inclination adopted is a compromise between obtaining the desired separation and minimising pressure loss through the filter, and will therefore vary depending inter alia upon the material to be separated in the filter and their velocity.

I claim:

1. A filter for separating a stream of mixed materials into a material of greater density and a material of lesser density, said filter comprising a hollow body having an upstream end and a downstream end, means defining an inlet at said upstream end of said body for receiving said stream, means defining a pair of separate outlets at said downstream end of said body for discharging the respective separated materials, said body having a passage extending therethrough from said inlet to said outlets, and at least one set of separator vanes disposed in said body and spaced along said passage, said vanes being positioned to define at least one boundary of a first flow path extending longitudinally of said passage from said inlet to one of said outlets, each separator vane having an upstream edge, a first surface portion which extends from said upstream edge in a downstream direction and which is inclined towards the inlet, a second surface portion which extends downstream from said first portion and which is inclined towards the outlets and an apex junction between said first and second portions, adjacent vanes of said set being mutually spaced longitudinally of said passage so as to define second flow paths therebetween, said second flow paths leading from said first flow path to the other of said outlets, said vanes being so disposed that in each pair of adjacent vanes comprising an upstream vane and a downstream vane the upstream edge of the downstream vane is aligned, longitudinally of said passage with a part of said second surface portion of the upstream vane, said part being spaced downstream from said junction of said upstream vane whereby said junction of said upstream vane masks said second flow path defined between said upstream and said downstream vane against ingress of material of greater density flowing in said stream along said first flow path.

2. A filter as claimed in claim 1, wherein each second flow path is generally divergent in the intended direction of flow of material therethrough.

3. A filter as claimed in claim 1, wherein the minimum cross-section areas of the second flow paths decreases from extreme upstream second flow path to an extreme downstream second flow path.

4. A filter as claimed in claim 1, wherein said second flow paths become increasingly tortuous towards a downstream end of said set.

5. A filter as claimed in claim 1 wherein the second surface portion of each vane is of concave form in the longitudinal direction of said body.

6. A filter as claimed in claim 1, wherein the first surface portion of each vane is generally linear.

7. A filter as claimed in claim 1, wherein said passage is generally convergent from said inlet to said outlets.

8. A filter as claimed in claim 1, wherein at least a part of said passage in which said vanes are disposed is divergent in the downstream direction of said body.

9. A filter as claimed in claim 1 wherein a further vane is disposed in a downstream end portion of the body and is spaced from a wall of said passage so as to define therebetween one of said outlets for the separated material.

10. A filter as claimed in claim 1, wherein said material of lesser density is air and said material of greater density is solid particulate material.

11. A filter as claimed in claim 1, wherein said first flow path is convergent in the intended direction of flow of material therethrough.

12. A filter as claimed in claim 1, wherein at least one of said second flow paths defined between adjacent vanes has a portion which extends in an upstream direction relative to the intended direction of flow of material along said first flow path.

13. A filter as claimed in claim 12, wherein said at least one of the second flow paths is disposed in a downstream end portion of the body.

14. A filter as claimed in claim 1, wherein said first surface portion is inclined at substantially 34° to the longitudinal axis of the body.

15. A filter as claimed in claim 14, wherein the inner annular wall is configurated so as to define said throat.

16. A filter as claimed in claim 1, wherein a partition extends longitudinally along said passage, and two sets of separator vanes are provided, one on each side of said partition.

17. A filter as claimed in claim 16, wherein further vanes are disposed on either side of said partition in a downstream end portion of the body and are spaced from said partition so as to define therebetween one of said outlets for the separated material.

18. A filter as claimed in claim 1, wherein said passage is provided with a throat upstream of said at least one set of vanes.

19. A filter as claimed in claim 18, wherein said throat is defined by walls on opposite sides of said passage which walls are both configurated.

20. A filter as claimed in claim 18, wherein said throat is defined by walls on opposite sides of said passage, one of which walls is predominantly linear in the longitudinal direction of said passage and, the other of which walls is configurated.

21. A filter as claimed in claim 20, wherein said body is annular in transverse cross-section, said passage is defined between inner and outer annular walls, and the outer annular wall is configurated so as to define said throat.

22. A filter as claimed in claim 18, wherein said vanes extend between and are secured to a pair of side plates which are separate from side walls of said passage, and a portion defining said throat also extends between and is secured to said side plates.

23. A filter as claimed in claim 18, wherein one of said side walls of said passage has apertures therein respectively corresponding in shape to the cross-section shapes of said vanes, through which apertures said vanes respectively slidably extend so that one of said side plates is disposed internally of said passage and the other of said side plates is disposed externally of said passage, and such that the assembly of vanes and slide plates is slidable laterally relative to the body, and wherein a portion defining said throat also extends between and is secured to said side plates, and said one of the side walls of said passage has a further aperture therein which corresponds in shape to the cross-sectional shape of said portion, through which further aperture said portion slidably extends.

24. A filter as claimed in claim 1, wherein said body is annular in transverse cross-section, and said passage is defined between inner and outer annular walls.

25. A filter as claimed in claim 24, wherein a single set of vanes is provided, the vanes in said set being annular in transverse cross-section and being disposed between said inner and outer annular walls.

26. A filter as claimed in claim 24, wherein said outlets for the separated materials are annular, the outlet for the material of greater density being surrounded by the outlet for the material of lesser density.

27. A filter as claimed in claim 24, wherein said outlets for the separated materials are annular, the outlet for the material of greater density being disposed externally of the outlet for the material of lesser density.

28. A filter as claimed in claim 1, wherein said body is of hollow tubular form.

29. A filter as claimed in claim 28 wherein said body is circular in transverse cross-section.

30. A filter as claimed in claim 28, wherein said body is oval in transverse cross-section.

31. A filter as claimed in claim 28, wherein said vanes extend between and are secured to side walls on opposite sides of said passage.

32. A filter as claimed in claim 28, wherein said vanes extend between and are secured to a pair of side plates which are separate from side walls of said passage.

33. A filter as claimed in claim 32, wherein said vanes are integral with said plates.

34. A filter as claimed in claim 32, wherein one of said side walls of said passage has apertures therein respectively corresponding in shape to the cross-section shapes of said vanes, through which apertures said vanes respectively slidably extend such that one of said side plates is disposed internally of said passage and the other of said side plates is disposed externally of said passage, and such that the assembly of vanes and side plates is slidable laterally relative to the body.

35. A filter as claimed in claim 34, wherein the side plate which is disposed internally of said passage has a longitudinal edge in contact with a wall of said passage, such that said side plate effects a scraper action over said wall when said assembly is moved laterally relative to the body in use.

36. A filter as claimed in claim 28, wherein a single set of vanes is provided, the vanes in each set being annular in transverse cross-section and being stacked together.

37. A filter as claimed in claim 36, wherein the downstream vane in each pair of adjacent vanes is surrounded by the upstream vane of said pair in the transverse direction of said body, and said first flow path is convergent and is disposed internally of said set of annular vanes.

38. A filter as claimed in claim 36, wherein the downstream vane in each pair of adjacent vanes surrounds the upstream vane of said pair in the transverse direction of said body, and said first flow path is annular and convergent and is disposed between said set of annular vanes and side walls of said passage.

39. A filter as claimed in claim 36, wherein side walls of said passage are configured so as to define a throat.

40. A filter as claimed in claim 36 wherein a member extends through said set of annular vanes in the longitudinal direction of said passage, and an upstream end of said member is enlarged so as to define a throat.

41. A filter as claimed in claim 23, wherein said portion is integral with said side plates.

42. A filter as claimed in claim 41, wherein said body is rectangular in transverse cross-section.

43. A filter as claimed in claim 1, wherein at least some of said vanes are hollow and are each provided with an opening therein providing communication between the interior of said vane and said first flow path.

44. A filter as claimed in claim 43, wherein each said opening opens onto a respective zone of said first flow path which is normally stagnant in use.

45. A filter as claimed in claim 43, wherein the interiors of said at least some of the vanes communicate with a common duct which is connected to an outlet.

* * * * *